United States Patent [19]

Naidoff

[11] 3,927,233

[45] Dec. 16, 1975

[54] WELDED POLYMERIC ARTICLES AND PROCESS

[75] Inventor: Robert J. Naidoff, Mountain View, Calif.

[73] Assignee: Raychem Corporation, Menlo Park, Calif.

[22] Filed: Jan. 25, 1974

[21] Appl. No.: 436,674

[52] U.S. Cl. .................... 428/58; 138/99; 156/304; 285/21
[51] Int. Cl.² ........................................... B32B 3/10
[58] Field of Search .............. 156/304, 306; 138/99; 161/36; 285/21, 22, 423; 428/58

[56] References Cited
UNITED STATES PATENTS

| 1,899,067 | 2/1933 | Trumbull | 156/304 |
|---|---|---|---|
| 2,388,297 | 11/1945 | Slaughter | 156/304 |
| 3,002,871 | 10/1961 | Tramm et al. | 285/21 |
| 3,297,819 | 1/1967 | Wetmore | 174/127 |
| 3,650,872 | 3/1972 | McKiernan | 156/304 |
| 3,741,843 | 6/1973 | Louis | 156/304 |

*Primary Examiner*—William E. Schulz
*Attorney, Agent, or Firm*—Lyon & Lyon

[57] ABSTRACT

Described herein are butt-welded polymeric articles and means of effecting joinder of crosslinked polymeric articles by means of such welds. The invention finds application in, e.g., forming large-diameter heat recoverable sleeves from cross-linked polymeric sheet for, e.g., corrosion-proofing pipe joints and the like. The weld is effected by heating under compression a thermoplastic insert containing a peroxide or other heated-activated crosslinking agent.

12 Claims, 6 Drawing Figures

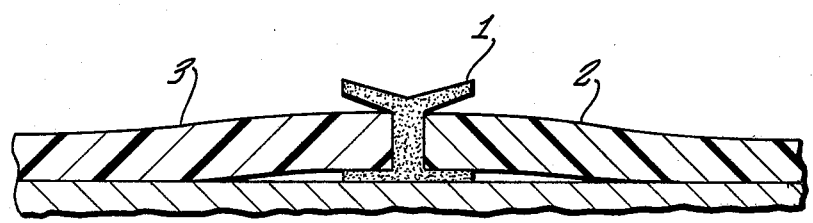
FIG.1.
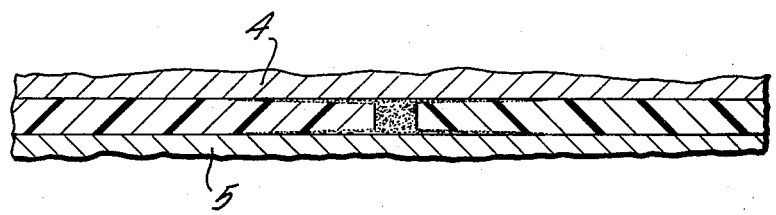
FIG.2.
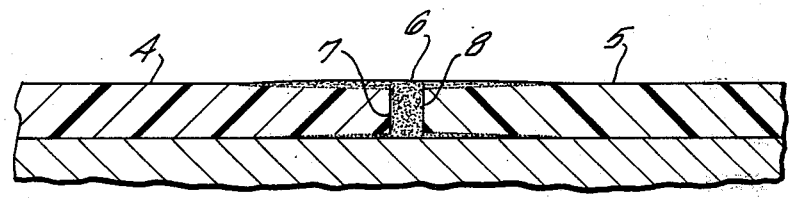
FIG.3.
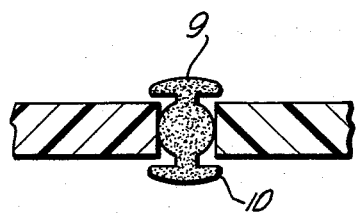 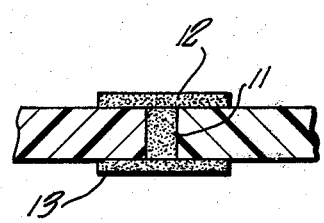
FIG.4.  FIG.5.
FIG.6.

WELDED POLYMERIC ARTICLES AND PROCESS

BACKGROUND OF THE INVENTION

Thin-walled polymeric articles are commonly crosslinked, as by the agency of high energy, ionizing radiation, to impart form stability at melt temperatures. Again, such articles are commonly irradiated or otherwise crosslinked in the course of producing heat recoverable or heat shrinkable articles like those disclosed in Cook U.S. Pat. No. 3,086,242, the disclosure of which is incorporated herein by reference. Heat recoverable sleeves have been found highly effective as corrosion resistant coverings for pipe joints as disclosed in Wetmore U.S. Pat. No. 3,297,819, Conde U.S. Pat. No. 3,379,218, Heslop et al U.S. Pat. No. 3,415,287, Ellis U.S. Pat. No. 3,455,336, Wilson U.S. Pat. No. 3,530,598 and Evans U.S. Pat. No. 3,770,556, the disclosures of which are incorporated herein by reference. Large diameter pipes are, of course, widely used in many industries, including the oil and gas transmission industries. Large diameter sleeves cannot conveniently be extruded, so that heretofore such sleeves have most commonly been made in a "wrap-around" configuration such as those shown in the Conde, Ellis, Wilson, and Evans Patents noted above. Most commonly in the case of such devices, the sleeve is formed in situ in the field when opposed edges of the wrap-around device are brought into adjacency and secured, one to the other, by mechanical means. To expedite field installation, it would be advantageous to supply to the field a preformed large diameter sleeve, and to this end it has hitherto been proposed to overlap the opposite edges of a polymeric sheet, disposing between the overlapping segments a peroxide crosslinking agent which is then cured. Thus far, that resort has in large part proved unsuccessful because, apparently owing to uneven crosslink formation, the edges of the overlapped surfaces pucker severely upon expansion, presenting an unsightly weld conceivably subject to failure in the peel mode. Heretofore, joints have been formed by disposing thermoplastic materials between crosslinked polymeric articles to be joined, whereafter the thermoplastic substance is heated to its melt temperature. Of course, that approach is unsuited to the production of heat recoverable sleeves because the process by which heat recoverability is imparted involves expansion of the sleeve at high temperatures calculated to occasion the failure of any thermoplastic joint. Accordingly, until this time the extant need for provision of a means of integrally joining thin-walled cross-linked polymeric articles has gone unsatisfied.

BRIEF SUMMARY OF THE INVENTION

According to this invention, there is provided a method of integrally joining abutting surfaces of crosslinked polymeric articles which comprises disposing between those surfaces an insert consisting essentially of a thermoplastic polymeric composition containing an effective cross-linking amount of a heat-activated crosslinking agent, and heating the surfaces and insert under compression to cause the insert to flow and wet those surfaces and to activate the cross-linking agent, effecting formation of covalent crosslinks between the surfaces and the polymeric constituent of the insert. The modulus of the resulting crosslinked butt weld is at least equal to and preferably greater than that of the joined articles. Surprisingly, notwithstanding the fact that the segments joined are themselves crosslinked from the outset, joints formed according to this invention withstand at high temperature the substantial tensile stresses imposed during sleeve expansion.

One object of this invention is to provide a method of integrally joining, e.g., abutting edges of thin-walled crosslinked polymeric articles.

Another object of the invention is to provide buttwelded crosslinked articles capable of withstanding substantial tensile stress at elevated temperature.

Further object of the invention is to provide such articles in which the weld is of essentially the same thickness as the joined thin-walled segments themselves.

The manner in which these and other objects and advantages of the invention are secured will appear from the more detailed description which follows and from the accompanying drawing in which:

FIGS. 1–3 sequentially illustrate one preferred manner of forming butt-welds according to this invention; and FIGS. 4–6 illustrate alternatively configured thermoplastic inserts for use in the process of this invention, and the manner in which they are disposed between articles intended for joinder.

DETAILED DESCRIPTION OF THE INVENTION

In preferred embodiments, sleeves are formed by welding the edges of polymeric sheet, one to another. Articles to be joined by the practice of this invention may be formed from essentially any polymeric material capable of being crosslinked by the agency of heat-activated systems, e.g., polyolefins, polysiloxanes, unsaturated polyesters, polyvinyl halides, natural rubber, etc. Most preferred are the polyolefins e.g., polyethylene; poly(butene-1); various copolymers of ethylene, propylene and butene; ethylene ethyl acrylate, ethylene vinyl acetate, or ethylene methacrylate copolymers in which repeat units derived from the ethylene comoner predominate (e.g., about 80–96 percent), and blends of such copolymers containing major proportions of polyethylene itself.

As previously noted, polymeric articles to be joined are crosslinked from the outset, and preferably exhibit modulus in the range from about 20 to about 60 psi. As used herein, "the term modulus" connotes modulus determined at 150°C and 100 percent elongation. Articles to be joined are preferably crosslinked by high energy ionizing radiation, dosage ranging from, e.g., about 5 to about 20 megrads, preferably from about 12 to about 15 megrads.

The invention finds its preferred application in the joinder of thin-walled articles (e.g., sheet ranging in thickness from about 60 to about 120 mils). An article is "thin-walled" for present purposes when its thickness is substantially less than length or width. Reference to the "primary faces" of joined articles connotes the surface which is the product of length and width as so defined. The invention has proven ideally suited to joining polymeric sheet to form sleeves whose recovered diameter is equal to or greater than 12 in., and commonly equal to or greater than about 18 in.

The polymeric constituent of the thermoplastic insert can be chosen within wide bounds, including a great variety of melt processeable materials capable of being crosslinked by heat-activated systems. Since the crosslinking agent is most desirably blended with the polymeric constituent of the insert in the melt phase, a predominant consideration in choice of insert thermoplastic is melt processability at temperatures less than the heat-activation temperature of the crosslinking agent. With the polyethylenic materials most preferably employed in the articles to be joined, preferred insert polymeric constituents include ethylenevinyl acetate, ethylene-methyl acrylate and ethylene-ethyl acrylate copolymers and blends of such copolymers with minor proportions of polyethylene. Such copolymers commonly contain on the order from about 70 to about 96 percent by weight repeat units corresponding to the ethylene comonomer, and most commonly contain from about 80 to about 96 percent by weight of such units.

A wide variety of systems may be mentioned as candidates for crosslinking employment, including bisazodicarboxylates such as methyl and ethyl bisazodiformates, sulfonazides such as 1, 10-decane bis(sulfonazide), azodicarbonamine, 3, 3'-dimethoxy-4,4'-diazodiphenyl and 2,2'-azobisisobutyronitrile. Most preferred are peroxide crosslinking agents, e.g., t-butyl perbenzoate, 2,5-dimethyl-2,5-di(t-butyl peroxy) hexane, 2,5-dimethyl-2,5-di(t-butyl peroxy) hexyne-3,dicumyl peroxide, benzoyl peroxide, methylethylketone peroxide, cumene hydroperoxide, t-butyl hydroperoxide and di-t-butyl peroxide. Such agents are employed in effective crosslinking proportions, as in conventional practice. Most commonly, the agents are obtained coated on a calcium carbonate or other particulate substrate, and are employed in proportions ranging from about ¼ to about 2 percent by weight active agent, most preferably from about ½ to about 1 percent by weight active agent. Especially where the amount of crosslinking agent employed is at the lower end of the foregoing ranges, and most especially where non-peroxide crosslinking agents are used, it is preferred to additionally combine in the insert a so-called "co-agent" to maximize the number of crosslinks formed through the agency of a given number of free radicals generated by the agent itself. The use of such co-agents is conventional and is discussed in, e.g., L. P. Lenaf, *I & E. Chem. Prod. Research & Development*, 2, No. 3, 202 (1963), which publication is incorporated herein by reference. Among conventionally employed co-agents may be mentioned m -phenylene dimaleimide, trimethylol propane trimethacrylate, pentaerythritol tetraacrylate, triallyl cyanurate, triallyl isocyanurate, allyl methacrylate, diallyl phthalate, triallyl citrate, tetraallyl pyromellitate and triallyl mellitate. Such co-agents are employed in minor proportions, e.g., 0.5 to 2 percent, most preferably from about ½ to about 1 percent by weight. The objects in proportioning crosslinking agent and co-agent are two-fold. Crosslinking must be sufficient to ensure that the modulus of the ultimate weld is at least equal to, and preferably greater than, that of the thin-walled articles joined. Otherwise, the weld may be subject to failure during the high temperature expansion associated with the impartation of heat recoverability. On the other hand, care must be taken to ensure that the weld is not crosslinked to too great an extant, with concomitant embrittlement. Preferably, the modulus of the weld is not greater than about twice that of the articles joined. Weld modulus can in particular cases range from about 20 to about 250 psi. However, a substantial failure rate may be experienced at moduli greater than about 150, and most preferably the weld modulus is in the range from about 50 to about 100 psi.

Of course, in addition to crosslinking agent, polymeric constituent and, where used, co-agent, the weld may contain additional conventional addends, e.g., filler, ultraviolet stabilizers, antioxidants, acid acceptors, etc. Fillers such as carbon black, calcium carbonate and the like are employed in substantial (albeit minor) proportions in order to, inter alia, assist in conducting heat from surface to the interior of the insert. Preferably, on the order of about 20 percent such filler is employed.

Welding is effected at temperatures sufficient to cause the polymeric constituent of thermoplastic to flow and wet the surface of the articles to be joined, and also sufficient to activate the crosslinking system. FIGS. 1–3 depict in sequence a typical welding operation in which an insert 1 generally I-shaped in cross-section is disposed between the abutting edges of polymeric sheet segments 2 and 3, the edges of the segments being inserted in the channels bottoming on the upstanding portion of the I. The resulting assembly is compressed, as by heated platens 4 and 5 (FIG. 2), which cause the polymeric constituent of the insert to flow, wetting adjoining surfaces of the segments to be joined. Preferably, shims (not shown) approximating in thickness the compressed thickness of the polymeric sheet are disposed at either end of the insert and, by acting as dams, prevent excessive out flow of the melted insert at the weld ends. Consequently, the weld ends need not be trimmed, thus avoiding the possiblity that any voids in the weld occasioned by co-agent gassing will be pierced in course of trimming, with consequent creation of stress-raising discontinuities. To a substantial degree, it is believed that the compressive force reduces the likelihood of serious gassing. Ordinarily, on the order of about 30 psig platen pressure is applied.

Once crosslinking between the melted insert and the polymeric sheet has been effected, the platen may be cooled to reduce the joint in temperature, whereafter the upper platen 4 is withdrawn, freeing the formed joint (FIG. 3). The platens may be conventionally heated, either electrically or with steam. Preferably, heating and cooling are effected by sequentially forcing steam and cooling water through passageways formed in the platen itself.

With reference to FIG. 3, it will be noted that the resulting butt-weld 6 is contiguous with both with the aligned edges 7 and 8 of sheets 2 and 3 and with regions of their primary surfaces immediately adjacent those edges. In this fashion, the weld is made continuous past the aligned edges of the polymeric sheet, so that failure along the interfaces between the weld and edges 7 and 8 is discouraged. To this end, the insert is so configured and positioned as to ensure that those regions of the primary sheet surfaces are wetted during insert melting. The generally I-shaped insert depicted in FIGS. 1–3 is designed with this in mind. FIGS. 4, 5 and 6 depict alternative insert configurations by which that object may be achieved. The rails 9 and 10 which extend from the core of the insert depicted in FIG. 4 ensure wetting of the primary surfaces of the polymeric sheet. The same object is achieved by the multi-part insert depicted in FIG. 5, which is composed of a core 11 and separately disposed slabs 12 and 13. More simply, a slab can be diagonally disposed in the space between aligned sheet edges, as shown in FIG. 6. The insert may be made as wide or as narrow as is desired, only so long as one ensures that sufficient material is provided to fill the gap between the aligned edges to be joined. Ordinarily, that gap is on the order of ⅛ in. in width.

In the preferred embodiment in which the welding process of this invention is used to form large diameter sleeves intended for the impartation of heat recoverability, the weld-formed sleeves are heated to above the crystalline melting temperature of the sheet of which the sleeve is formed and diametrally expanded. A preferred means of sleeve expansion is disclosed in the commonly assigned, concurrently filed application of Greuel and Naidoff entitled "Expansion Apparatus" Ser. No. 436,675 filed Jan. 25, 1974 (now abandoned).

In the Examples of preferred embodiments which follow, all parts and percentages are by weight unless otherwise indicated, and all temperatures are reported in degrees centigrade. Modulus values are expressed in pounds per square inch. All welds were effected at a platen temperature of about 205° and platen pressure on the order of about 30 psig. In each case, following completion of the indicated "bond time" (i.e., that period during which the platen is heated), the platens were water-cooled while in place for about 2–5 minutes. All inserts employed included 1 percent by weight lead fumarate acid acceptor, 2.5 percent fine carbon black as an ultraviolet stabilizer, and 1 percent by weight co-agent. In Examples 1,2 and 5–8, the proportions of crosslinking agent reported in Table I include 50 percent by weight inert carrier. In the case of Examples 3 and 4, 1/3 of the reported proportion of crosslinking agent is inert carrier. In the case of every Example, the opposed edges of a 60 mil cross-linked polymeric sheet (modulus = 15–30 psi) were welded to form a sleeve. The sheet in every case was formed of a blend of high density polyethylene (melt index 0.2, density 0.95) and a copolymer of ethylene and methyl acrylate (20 percent methyl acrylate), the two polymers being blended in the respective proportions 56:20. The sheet also contained 20 percent large particle carbon black filler and minor proportions of both antioxidant and ultraviolet stabilizer.

EXAMPLES 1–8

The composition and configuration of the inserts employed appears from Table I, as do the bond times and resulting weld modulus.

TABLE I

| Insert Constituent | Example No. | | | | | | | |
|---|---|---|---|---|---|---|---|---|
| | 1 | 2 | 3 | 4 | 5 | 6 | 7 | 8 |
| ethylene-vinyl acetate copolymer (20% vinyl acetate); M.I. 0.3, density .93 | — | 72% | — | 71.5% | 33.5% | 20% | — | — |
| ethylene-vinyl acetate copolymer (18 vinyl acetate); M.I. 2.5, density .94 | 72% | — | 71.5% | — | — | — | — | 34.5% |
| polyethylene (Marlex 5202, Phillips Petroleum Corp.), M.I. 0.2, density 0.95 | — | — | — | — | 60% | 53.5% | — | — |
| ethylene-vinyl acetate copolymer (4% vinyl acetate), (Gulf 6200, Gulf Oil Corp.) | — | — | — | — | — | — | 74.5% | — |
| polyethylene, M.I. 1.0, density 0.93 | — | — | — | — | — | — | — | 40% |
| carbon black (filler) | 20% | 20% | 20% | 20% | — | — | 20% | 20% |
| CaCO₃ (filler) | — | — | — | — | — | 20% | — | — |
| MgO (acid acceptor) | 2.5% | 2.5% | 2.5% | 2.5% | — | — | — | — |
| 2,5-dimethyl-2,5-di(t-butyl peroxy) hexane | 1% | 1% | — | — | — | 1% | 1% | 1% |
| t-Butyl perbenzoate | — | — | 1.5% | 1.5% | — | — | — | — |
| 2,5-dimethyl-2,5-di(t-butyl peroxy) hexyne-3 | — | — | — | — | 1% | — | — | — |
| modulus (psi) | 144 | 102 | 140 | 94 | 120 | 85 | 76 | 98 |
| bond time (min) | 7 | 7 | 5 | 5 | 10 | 7 | 7 | 7 |
| insert configuration | "I" | "I" | "I" | "I" | FIG. 6 | FIG. 6 | FIG. 6 | FIG. 6 |

The sleeves formed according to each of the preceding Examples were heated to 220° and expanded to twice their original diameters, employing the apparatus of the aforesaid concurrently filed application. In each case, the integrity of the welded joint was unaffected by the expansion process.

From the foregoing, it will be seen that this invention has provided novel and effective means for joining thin-walled segments of previously crosslinked articles. While emphasis thus far has been placed on formation of sleeves by welding the opposite edges of a single polymeric sheet, the invention can find use in diverse applications. For example, sleeves intended for use as heat recovered insulation about electrical conductor splices can be endreinforced by welding to the respective sleeve ends barrels of a material more rigid than the sleeve body itself. Again, large diameter sleeves may be formed by welding to a first heat recoverable panel a second panel which is dimensionally heat stable save for normal thermal expansion and contraction. The resulting sleeve can then be heat recovered about a substrate without necessary resort to the typical procedure in which the entire sleeve is brought to heat recovery temperature. Analogously, an elastomeric panel could be welded to a heat recoverable panel to form a sleeve in such fashion that the forces of heat recovery occasion distension of the elastomeric panel when the sleeve is heat recovered about substrate. Where the interior surfaces of such sleeves are provided with a coating of mastic or the like, the resulting hoop stress would encourage mastic to move and fill perforations in the sleeve itself encountered in the course of insulative service. As another application to which the invention is suited may be mentioned edge reinforcement of wrap-around sleeves. Commonly, the opposite edges of such a sleeve are comprised of a relatively thickened upstanding portion configured to receive a rail or other mechanical device by which closure is effected. To discourage pull out of those portions from the mechanical closure device resulting from the forces of recovery, the thickened edge portions of the wrap-around sleeve could, according to the practice of this invention, be separately formed of the material less yielding at recovery temperature and subsequently insert welded to the body portion of the sleeve. In light of this disclosure, other applications to which this invention may usefully be put will occur to those skilled in the art.

I claim:

1. A method of integrally joining abutting surfaces of crosslinked polymeric articles which comprises disposing between said surfaces an insert consisting essentially of a melt processable thermoplastic polymeric composition capable of being crosslinked by heat-activated systems containing an effective cross-linking amount of a heat-activated cross-linking agent, and heating said surfaces and insert under compression for a time at a temperature sufficient to cause said insert to flow and wet said surfaces and to activate said cross-linking agent, effecting formation of covalent cross-links between each of said surfaces and the polymeric constituent of said insert, the modulus of the resulting cross-linked butt weld being at least equal to that of said articles.

2. A method of integrally joining abutting edges of crosslinked polymeric sheet which comprises disposing between said edges an insert consisting essentially of a melt processable thermoplastic polymeric composition capable of being crosslinked by heat-activated systems containing an effective cross-linking amount of a heat-activated cross-linking agent, and heating said surfaces and insert under compression for a time and at a temperature sufficient to cause said insert to flow and wet said edges and to activate said cross-links between each of said edges and the polymeric constituent of said insert, the modulus of the resulting cross-linked butt weld being greater than that of said sheet.

3. The method of claim 2 wherein said edges are opposite edges of a single such sheet.

4. The method of claim 3 wherein said polymeric composition additionally contains, in minor effective proportion, a polyfunctional coagent for said crosslinking agent.

5. The method of claim 4 wherein said crosslinking agent is a peroxide crosslinking agent.

6. The method of claim 5 wherein said sheet is predominately comprised of polyethylene and wherein the polymeric constituent of said insert is selected from the group consisting of ethylene-vinyl acetate, ethylene-methyl acrylate and ethylene-ethyl acrylate copolymers and blends of said copolymers with minor proportions of polyethylene.

7. The method of claim 2 wherein said insert is disposed between said edges in such fashion as to ensure that, upon heating under compression, the melted insert wets the primary surfaces of said sheet immediately adjacent said edges.

8. The method of claim 7 wherein said insert is generally I-shaped in cross-section, said edges being inserted in the channels bottoming on the upstanding portion of the "I" prior to the heating step.

9. A butt-welded cross-linked polymeric article comprising two thin-walled segments aligned edge-on and spaced apart, one from the other, by a contiguous weld comprising a melt processable thermoplastic polymeric composition that has been crosslinked during weld formation to become covalently cross-linked to the aligned edges and to regions of the primary surfaces of said segments immediately adjacent said edges, the modulus of said weld being greater than that of said segments.

10. A heat shrinkable sleeve according to claim 9 wherein said weld is continuous from a first to a second end of the sleeve and of essentially the same thickness as the walls of said sleeve.

11. An article according to claim 9 wherein one of said segments is dimensionally heat stable and the other is heat recoverable.

12. A cross-linked polymeric sleeve according to claim 9 made up of plural panels so butt-welded continuously along the their adjoining edges from a first to a second end of the sleeve, the thickness of the walls of said sleeve being essentially uniform about its circumference, one of said panels being heat recoverable and another of said panels being dimensionally heat stable.

* * * * *